(12) United States Patent
Ge et al.

(10) Patent No.: US 9,995,578 B2
(45) Date of Patent: Jun. 12, 2018

(54) IMAGE DEPTH PERCEPTION DEVICE

(71) Applicants: Chenyang Ge, Shaanxi (CN); Yanhui Zhou, Shaanxi (CN)

(72) Inventors: Chenyang Ge, Shaanxi (CN); Yanhui Zhou, Shaanxi (CN)

( * ) Notice: Subject to any disclaimer, the term of this patent is extended or adjusted under 35 U.S.C. 154(b) by 361 days.

(21) Appl. No.: 14/040,709

(22) Filed: Sep. 29, 2013

(65) Prior Publication Data

US 2014/0146136 A1    May 29, 2014

(30) Foreign Application Priority Data

Nov. 27, 2012  (CN) .......................... 2012 1 0490225

(51) Int. Cl.
   *H04N 13/00*   (2018.01)
   *G01C 3/32*    (2006.01)
   *G06T 7/579*   (2017.01)
   *G06T 7/223*   (2017.01)

(52) U.S. Cl.
   CPC ............. *G01C 3/32* (2013.01); *G06T 7/223* (2017.01); *G06T 7/579* (2017.01)

(58) Field of Classification Search
   CPC .. H04N 13/0007; H04N 13/00; G06T 7/0071; G06T 7/2013; G01C 3/32
   USPC .......................................................... 348/43
   See application file for complete search history.

(56) References Cited

U.S. PATENT DOCUMENTS

| | | | |
|---|---|---|---|
| 2007/0177152 A1* | 8/2007 | Tearney | A61B 5/0066 356/477 |
| 2011/0142289 A1* | 6/2011 | Barenbrug | G06T 7/136 382/107 |
| 2011/0158508 A1* | 6/2011 | Shpunt | G01B 11/25 382/154 |
| 2011/0243401 A1* | 10/2011 | Zabair | G06K 9/00 382/128 |
| 2011/0304693 A1* | 12/2011 | Border | H04N 13/026 348/46 |
| 2012/0008852 A1* | 1/2012 | Niu | H04N 13/0011 382/154 |
| 2012/0033051 A1* | 2/2012 | Atanassov | H04N 13/0239 348/49 |

(Continued)

*Primary Examiner* — Andy Rao
*Assistant Examiner* — Zaihan Jiang
(74) *Attorney, Agent, or Firm* — Dragon Sun Law Firm, P.C.; Jinggao Li, Esq.

(57) ABSTRACT

In view of the active vision model based on structured light, a hardware structure of a depth perception device (a chip or an IP core) for high-precision images is disclosed. Simultaneously, the module is not only capable of serving as an independent chip, but also an embedded IP core in application. Main principle of the module is as follows. Speckle image sequence (obtained from an external image sensor and unknown depth information) is processed by adaptive and uniform pre-processing sub-module, then is inputted to the module to be compared with the standard speckle image (known depth information), then motion-vector information of the inputted speckle image is obtained by pattern matching of image blocks (similarity calculation) by the block-matching motion estimation sub-module, then depth image is obtained by depth calculation, and finally high-resolution sequence of depth image is outputted by post-processing the depth image.

12 Claims, 4 Drawing Sheets

(56) References Cited

U.S. PATENT DOCUMENTS

| | | | |
|---|---|---|---|
| 2012/0287235 A1* | 11/2012 | Ahn | H04N 13/0429 348/43 |
| 2013/0106692 A1* | 5/2013 | Maizels | G06F 3/011 345/156 |
| 2013/0251281 A1* | 9/2013 | Bhaskaran | G06T 5/002 382/255 |
| 2014/0351073 A1* | 11/2014 | Murphy | G06Q 10/00 705/23 |

* cited by examiner

IMAGE DEPTH PERCEPTION DEVICE

BACKGROUND OF THE PRESENT INVENTION

Field of Invention

The present invention relates to a technical field of image processing, natural interaction and integrated circuit, and more particularly to a hardware structure of an image depth perception device.

Description of Related Arts

Vision is a most immediate and important way for people to observe and perceive the world. We live in a three-dimensional world, and the vision of human beings is not only capable of perceiving brightness, color, texture information and movements of an object surface, but also capable of judging shape, space and space position (depth) thereof. Acquiring real-time and high-precision depth information of images is a difficult problem for the development of current machine vision systems.

Natural and harmonious way of human-machine interaction is an idealistic requirement of people for operation of machines, in which machines are capable of reading the command transferred by people in a natural state. By hearing and vision and in natural manner such as languages, expressions, gestures and body languages to interact, utilization threshold of people on machines is further decreased. Utilizing image depth perception chip and device, real-time identifying and motion capturing of the three-dimensional image is capable of being realized, in such a manner that people are capable of interacting with the terminal in a natural manner such as face expressions, gestures and body languages, in such a manner that the idealistic goal that human are capable of manipulating the machines in a natural interaction manner is expected to achieve. The technique of image depth perception is gradually extending from peripherals of console to other intelligent terminals including intelligent television, smart cell phone, PC and tablet computer, so as to bring the users with dramatic manipulating manner and new experiences of human-computer interaction. Thus, the technique of image depth perception has extensive application prospect in fields of games and entertainments, consumer electronics, health care, education and etc.

Active vision model of structured light is capable of acquiring depth information of images accurately. Therefore, compared with a binocular stereo camera, the active vision model of structured light has advantages that: information of depth images acquired thereby is more stable and reliable, unaffected by ambient light, simple stereo matching process, low computational complexity and etc. E.g., somatosensory interaction device Kinect of Microsoft adopts an active vision model of infrared structured light, i.e., infrared laser projects images of fixed model onto a surface of a subject, which forms speckles after the diffuse reflection of the surface of the object. The speckles are collected by an image sensor to obtain a speckle image which is then calculated by an image depth perception device to obtain depth image information of the object.

In view of the active vision model based on structured light, the present invention provides a hardware structure of a depth perception device (a chip or an IP core) for high-precision images, which has advantages of simple in structure, low-overhead hardware and capable of generating a high-resolution depth image sequences in real time. Simultaneously, the module is not only capable of serving as an independent chip, but also an embedded IP core in application. Main principle of the module is as follows. Speckle image sequence (obtained by collection of an external image sensor and depth information thereof is unknown) is inputted to the module to be compared with a standard speckle image (with a known depth and range information as a reference), then motion-vector information of the inputted speckle image is obtained by pattern matching of image blocks (similarity calculation), then depth image is obtained by depth calculation, and finally high-resolution sequence of depth image is outputted by post-processing the depth image.

SUMMARY OF THE PRESENT INVENTION

The present invention provides an image depth perception device, comprising:

an image adaptive pre-processing sub-module, a block-matching motion estimation sub-module, a depth calculating sub-module and a memory, wherein an inputted speckle image sequence obtained and collected by an external image sensor is outputted to the image adaptive pre-processing sub-module in a digital video format;

the image adaptive pre-processing sub-module processes adaptive and uniform pre-processing on the inputted speckle image sequence with different characteristics of brightness, signal to noise ratio and size;

a standard speckle image with known depth and range information, which is processed by pre-processing, is permanently stored in the memory;

the block-matching motion estimation sub-module compares each inputted speckle image in the inputted speckle image sequence processed by pre-processing with the standard speckle image, and calculates displacement of image blocks in the inputted speckle image; and according to the displacement of the image blocks in the inputted speckle image, the depth calculating sub-module calculates depth information thereof, so as to obtain a calculated depth image sequence.

These and other objectives, features, and advantages of the present invention will become apparent from the following detailed description, the accompanying drawings, and the appended claims.

DETAILED DESCRIPTION OF THE PREFERRED EMBODIMENT

Figure 1:
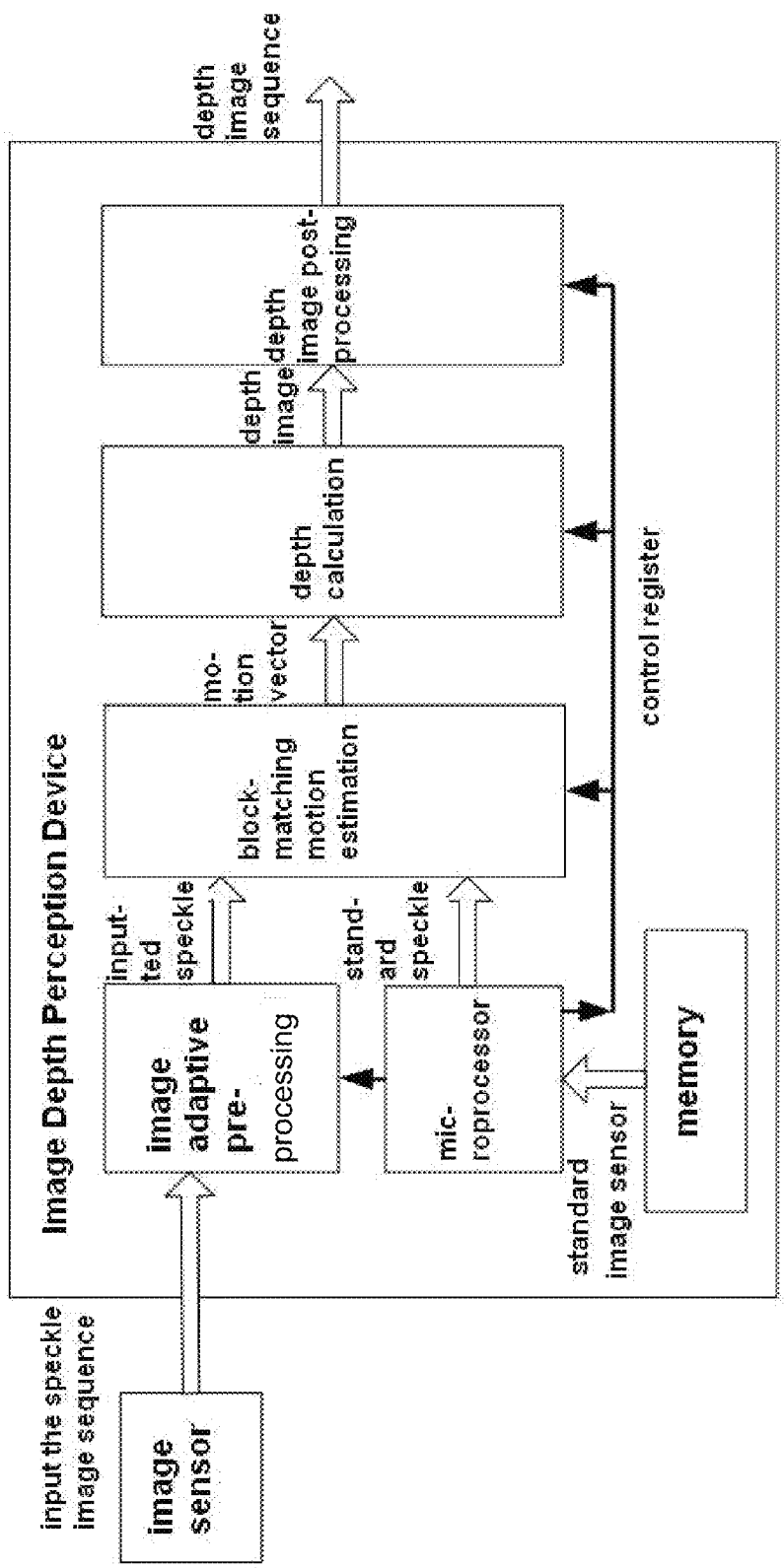
FIG. 1 is a block diagram of an image depth perception device according to a preferred embodiment of the present invention.

Further description of the present invention is illustrated combining with the preferred embodiments.

According to a preferred embodiment of the present invention, an image depth perception device is disclosed, comprising:

an image adaptive pre-processing sub-module, a block-matching motion estimation sub-module, a depth calculating sub-module and a memory, wherein:

an inputted speckle image sequence obtained and collected by an external image sensor is outputted to the image adaptive pre-processing sub-module in a digital video format;

the image adaptive pre-processing sub-module processes adaptive and uniformpre-processing on the inputted speckle image sequence with different characteristics of brightness, signal to noise ratio and size;

a standard speckle image with known depth and range information, which is processed by pre-processing, is permanently stored in the memory;

the block-matching motion estimation sub-module compares each inputted speckle image in the inputted speckle image sequence processed by pre-processing with the standard speckle image, and calculates displacement of image blocks in the inputted speckle image; and according to the displacement of the image blocks in the inputted speckle image, the depth calculating sub-module calculates depth information thereof, so as to obtain a calculated depth image sequence.

According to the preferred embodiment mentioned above, basic function of the image depth perception device is as follows. Speckle image sequence inputted by an external image sensor (depth information thereof is unknown) is processed with image adaptation, and then is compared with a standard speckle image (with a known depth and range information as a reference) which is permanently stored in a memory chip such as flash and EEPROM, then motion-vector information of the inputted speckle image is obtained by block-matching motion estimation (similarity calculation), then depth image is obtained by depth calculation, and finally high-resolution sequence of depth image is outputted by post-processing the depth image. The block-matching motion estimation sub-module is substantially used for similarity calculation between the inputted speckle image and the standard speckle image. Spot pattern of the inputted speckle image is considered to be obtained by operations of zooming or translating spot pattern of the standard speckle image. Calculating motion vector (displacement) of a corresponding spot block is used for calculating depth information thereof. The depth refers to a vertical distance between a plane that the block lies in and is perpendicular to a center axis of a speckle projector (z-axis) and a front end of the speckle projector.

The standard speckle image mentioned above can be obtained by methods as follows. The following methods are just for illustrating the preferred embodiment mentioned above and not intended to be limiting, because one skilled in the art can also obtain the standard speckle image through other ways. E.g., projecting laser beam (infared ray, visible light, ultraviolet ray and invisible light) of a permanently image onto a plane perpendicular to the center axis of the speckle projector (z-axis) and having a known position distanced, wherein the plane may comprise a projecting screen and a surface plate, and is for presenting a clear and stable speckle image. The speckle image formed on the plane is the standard speckle image. The inputted speckle image can also be obtained by the method mentioned above. The inputted speckle image contains an object for measuring depth information which is known. It is not difficult to understand that the object must be in an effective distance of the projecting of the speckle.

Preferably, according to another preferred embodiment of the present invention, the digital video format is Bayer, or ITU656/ITU601 video format; and the device further comprises an image depth perception module comprising a depth image post-processing sub-module which decreases noises by a method of noise-reducing filter, so as to output a high-resolution depth image sequence. In this preferred embodiment, the depth image post-processing sub-module is for further optimizing the depth image obtained. Since mismatching may exist during processes of block-matching motion estimation, moreover, Some occlusion areas are formed in the method of laser projecting, the depth image formed thereby have depth holes. The holes can be considered as noise of the depth image. In order to further improve accuracy thereof, the depth image post-processing sub-module employs a noise-reducing filter method to reduce the noise thereof, in such a manner that periphery of object in the depth image is more smooth and clear. The noise-reducing filter methods include a median filter method and an average filter method, but not limited to methods of traditional filter. The objects of the noise-reducing filter methods are all reducing noise. After the process of optimizing, the depth image sequence is outputted.

Preferably, according to another preferred embodiment of the present invention, a process of the pre-processing of the image adaptive pre-processing sub-module comprises steps of:

converting the inputted speckle image sequence and the standard speckle image to RGB format, then converting to YUV format via a color space conversion, and finally adaptively de-noising and enhancing on images of the YUV format.

In other words, this preferred embodiment is intended to limit a specific treatment process of the image adaptive pre-processing sub-module.

Preferably, according to another preferred embodiment of the present invention, a working process of the block-matching motion estimation sub-module comprises steps of:

extracting an image block $block_{m \times n}$ with a size of m×n from the inputted speckle image, in the standard speckle image and centered on a corresponding position of the image block $block_{m \times n}$ in a search block $search\_block_{M \times N}$ with a size of M×N, seeking an optimum matching block of the image block $block_{m \times n}$ by a microprocessor according to a search strategy and a similarity measurement indicator, wherein M, N, m and n are all integers, M>m, N>n, in such a manner that displacement of the image block $block_{m \times n}$ is obtained, i.e., motion vector.

Preferably, according to another preferred embodiment of the present invention, in the noise-reducing filter method, a filter method thereof is a median filter method or an average filter method.

Preferably, according to another preferred embodiment of the present invention, the depth calculating sub-module compares the speckle image with the standard speckle image, calculates displacement of the image blocks in the inputted speckle image, under a circumstance that the displacement of the image blocks, a focal length of an image sensor, a dot pitch parameter of pixels of the image sensor and a reference range of the standard speckle image are known, depth value corresponding to the image block is calculated by utilizing principle of laser triangulation measurement, then corresponding depth image of the inputted speckle image is generated by calculating the depth value of the image blocks in the inputted speckle image.

In this preferred embodiment, under a circumstance that the displacement of the image blocks, the focal length of an image sensor and the dot pitch parameter of pixels of the image sensor are known, relative change value of the depth can be calculated taking advantage of the displacement of the image blocks and the principle of laser triangulation measurement. Depth value corresponding to the image block can be obtained by adding the relative change value of the depth to the reference range of the standard speckle image, wherein when the relative change value of the depth is positive, the depth value corresponding to the image block is greater than the reference range of the standard speckle image; when the relative change value of the depth is negative, the depth value corresponding to the image block is smaller than the reference range of the standard speckle image; and when the relative change value of the depth is zero, the depth value corresponding to the image block is equal to the reference range of the standard speckle image.

Preferably, according to another preferred embodiment of the present invention, the depth calculating sub-module calculates depth of the image blocks in the inputted speckle image by a lookup table, wherein the lookup table is established according to different displacement values of the standard speckle image and corresponding depth value thereof.

This preferred embodiment achieves evaluating depth $d_{(x,y)}$ by a lookup table. E.g. in specific implementation, a horizontal displacement value $\Delta x$ or a vertical displacement value $\Delta y$ serves as an input value of the lookup table, so as to obtain an output depth value $d_{(x,y)}$, in such a manner that complex depth calculating formula is avoided, and simplification of hardware structure and savings of hardware resources are achieved.

Furthermore, corresponding relationship between the horizontal displacement value $\Delta x$ and the vertical displacement value $\Delta y$ can be obtained by the following method. Both the horizontal displacement value $\Delta x$ and e vertical displacement value $\Delta y$ are not in linear relation with the depth, and mapping relation there between can be obtained by processing block-matching motion estimation on each two blocks of different standard speckle images among a plurality of standard speckle images having different depth distance information d, such as d1, d2, d3, . . . , so as to obtain displacement between different standard speckle images. E.g., horizontal displacement values $\Delta x_{1,2}$, $\Delta x_{1,3}$, $\Delta x_{2,3}$ . . . and $\Delta y_{1,2}$, $\Delta y_{1,3}$, $\Delta y_{2,3}$ . . . are processed by curve fitting to obtain a relationship between the horizontal displacement value $\Delta x$, or the vertical displacement value $\Delta y$, and the depth distance d, so as to obtain a lookup table between anyone of the horizontal displacement value $\Delta x$, or the vertical displacement value $\Delta y$, and the corresponding depth distance d thereof by the curve fitting mentioned above. According to the lookup table, depth distance d of any image block corresponded to anyone of the horizontal displacement value $\Delta x$, or the vertical displacement value $\Delta y$ can be obtained.

Afterwards, depth values of all the image blocks of the inputted speckle images are calculated, and then the depth values of all the image blocks are combined to obtain the depth image corresponding to the inputted speckle image. The depth image is represented by a gray-scale image. E.g., the greater a gray value, the nearer the distance there between, i.e., the smaller is value of $d_{(x,y)}$; the smaller the gray value, the farther the distance there between, i.e., the greater is value of $d_{(x,y)}$. In addition, the gray-scale image can represent the depth image in an opposite way.

Preferably, according to another preferred embodiment of the present invention, the search strategy comprises: moving the image block in a horizontal direction, adding number of lines in a vertical direction, and searching the matching blocks one by one.

Optimally, according to another preferred embodiment of the present invention, the device further comprises a microprocessor, wherein the microprocessor not only reads the standard speckle image in the memory in a manner of serial port or parallel port, but also processes value estimation of initialization parameter and parameter configuration of the control registers on the image sensor and each sub-module mentioned above in a way of an internal control bus (IBC) or an IIC bus, which comprises: processing output format controlling on the image sensor, processing algorithm performance configuration, threshold setting and switch control on the image adaptive pre-processing sub-module, and processing size control of the image blocks and search window on the block-matching motion estimation sub-module, processing dynamic allocation on the lookup table of the depth calculating sub-module, and processing filter method selecting, threshold setting and switch controlling on the depth image post-processing sub-module.

FIG. 1 illustrates a block diagram of the image depth perception device according to the optimal embodiment mentioned above, which comprises the microprocessor. Specific description of the optimal embodiment is described as follows.

Figure 2:
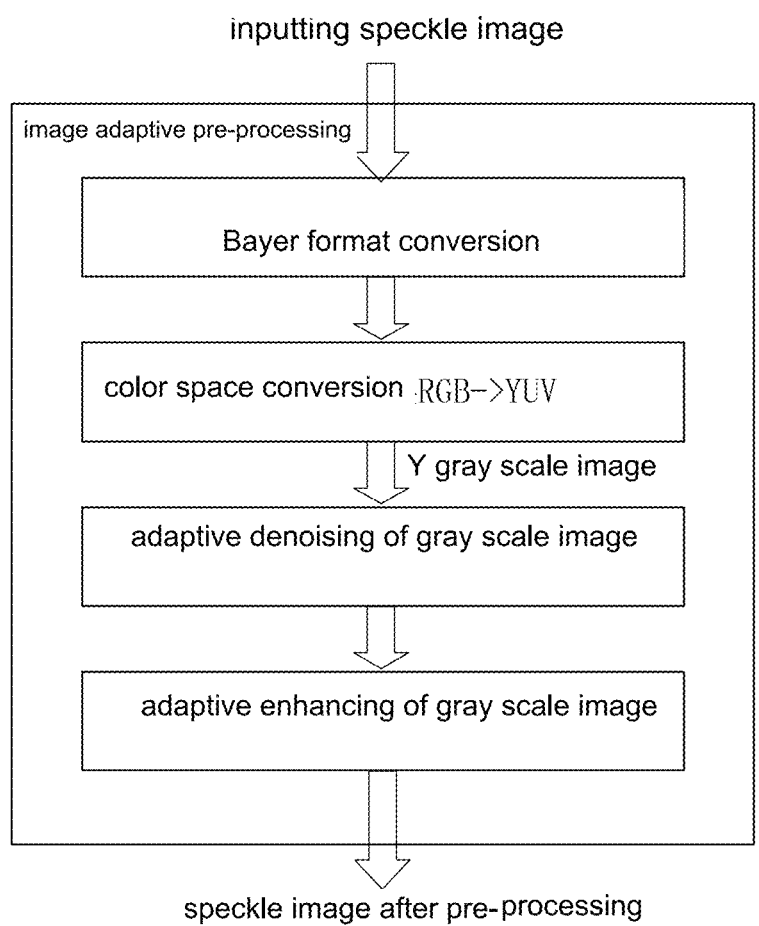
FIG. 2 is a flow block diagram of an image adaptive pre-processing sub-module according to the preferred embodiment of the present invention.

The image adaptive pre-processing sub-module processes pre-processing on the inputted speckle image, and processes adaptive and uniformpre-processing on the inputted speckle image with different characteristics, so as to achieve an object of improving accuracy of the block-matching motion estimation. E.g., when the inputted speckle image is in Bayer format, processing flow thereof is as shown in FIG. 2 of the drawings. The image adaptive pre-processing sub-module converts format of the image from Bayer format to RGB format, then converts the image format to YUV format by color space conversion (from RGB format to YUV format), and finally processes adaptive de-noising and enhancing on the YUV format. Method of the adaptive de-noising includes window filter, Gaussian filter and etc., but is not limited to these traditional image de-noising methods, so as to improve signal-to-noise ratio of the image. Method of the image enhancing includes histogram enhancing, gray linear enhancing, binarization processing and etc, but is not limited to these traditional image enhancing methods, in such a manner that characteristic of the inputted speckle image is more obvious. Finally, inputted speckle image sequence processed by pre-processing is outputted.

In this optimal embodiment, the microprocessor processes value estimation of initialization parameter and parameter configuration of a control register on the image adaptive pre-treatment processing sub-module, the block-matching motion estimation sub-module, the depth calculating sub-module and the depth image post-processing sub-module, and inputs the standard speckle image permanently stored inform the memory (Flash, EEPROM and other memory mediums) in a way of serial port or parallel port. The standard speckle image is processed by the image adaptive pre-processing, and is permanently stored in the memory medium for serving as a standard reference. Assuming that the microprocessor reads part datas of the standard speckle image from the memory via an inner controller into an inner data bus, it is not difficult to understand that contents of the data of the standard speckle image read thereby are closely related to position of current matching block of the inputted speckle image and preset size of search window.

Figure 3:
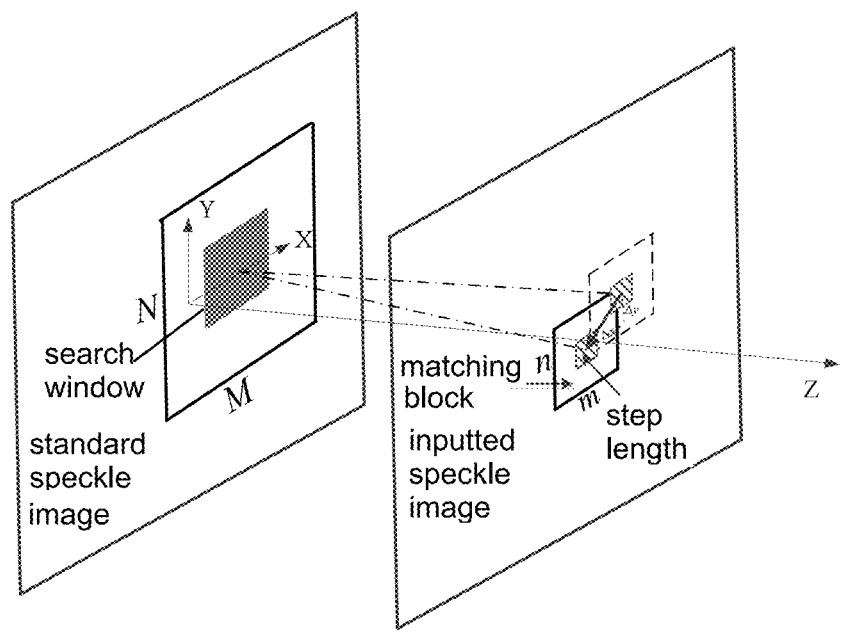
FIG. 3 is a schematic view of a block-matching motion estimation sub-module according to the preferred embodiment of the present invention.
Figure 4:
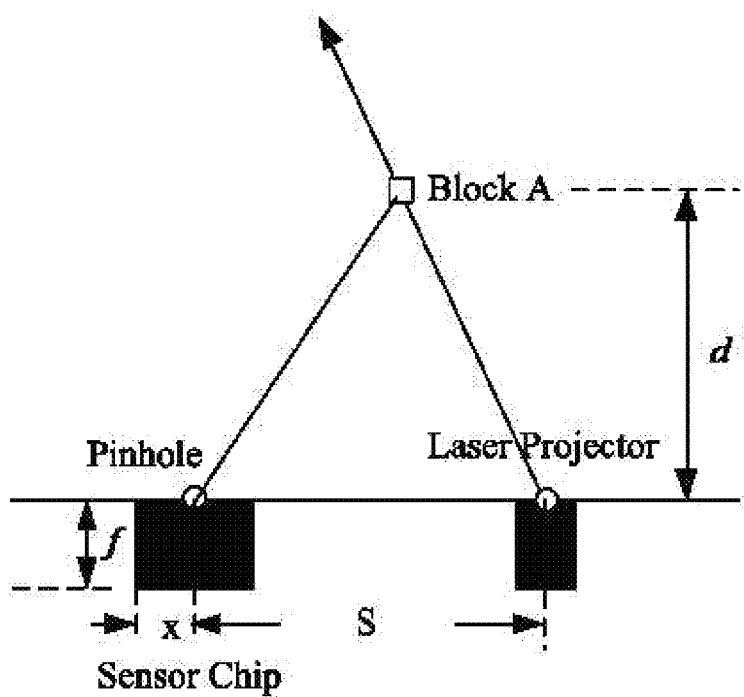
FIG. 4 is a sketch view of a principle of a laser triangulation measurement.

The block-matching motion estimation sub-module is for evaluating motion vector of the inputted speckle image. (See FIG. 3)

As mentioned above, the search strategy of the matching blocks in the search window can be: moving the image block in a horizontal direction, adding number of lines in a vertical direction, and searching the matching blocks one by one, wherein matching interpolation thereof can achieve an accuracy level up to sub-pixels.

In particular, the method of the block-matching motion estimation is different from conventional block-matching motion estimation calculation. During the process of matching of the conventional block-matching motion estimation calculation, step length l of the matching block is equal to the size of the matching block, the step length l of image block extracted from the inputted speckle image can be smaller than the size of the matching block thereof, the motion vector evaluated by block matching just represents motion vector of pixels in a central zone of motion block and in a range having the step length l (shadow area in FIG. 3). The method of the present invention is capable of compromising between accuracy of the motion vector and the mismatching of motion vector of small objects.

Thus, preferably, according to another preferred embodiment of the present invention, the step length of the image blocks extracted from the inputted speckle image is less than a size of the matching block thereof.

The image depth perception device according to all the preferred embodiments mentioned above can not only be utilized as a separate chip, but also in a SoC chip serving as an embedded IP core. The image depth perception device of the present invention can not only utilize structured light model generated by different laser sources such as infrared ray, visible light, ultraviolet ray and invisible light, but also utilize projecting scheme of different images, such as speckle images of a t circular point shape, a massive shape, a crosswise shape or a stripe shape.

Therefore, one skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An image depth perception device, comprising:
an image adaptive pre-processing sub-module configured:
to receive a standard speckle image having known depth and range information and an inputted speckle image sequence comprising inputted speckle images captured by an image sensor in a digital video format and having different characteristics of brightness, signal to noise ratio and size, wherein the standard speckle image is an image projected onto a plane perpendicular to the center axis of a speckle projector (z-axis) and having a known position distance, and
to perform adaptive and uniform pre-processing on the standard speckle image and the inputted speckle image sequence, wherein the adaptive and uniform pre-processing comprises (a) converting format of the standard speckle image and the inputted speckle images from a Bayer format to a RGB format, (b) converting the RGB format to a YUV format by color space conversion, (c) processing adaptive denoising on the YUV format, and (d) processing adaptive enhancing on the YUV format, so as to improve brightness uniformity of the inputted speckle images and the signal-to-noise ratio of both the standard speckle image and the inputted speckle images;

a memory for storing the pre-processed standard speckle image;

a block-matching motion estimation sub-module configured to compare each of the inputted speckle images in the pre-processed, inputted speckle image sequence with the pre-processed standard speckle image to calculate displacement of image blocks in the pre-processed inputted speckle image, wherein the block-matching motion estimation sub-module is configured to perform the comparison and the calculation by:
extracting an image block $block_{m \times n}$ with a size of m×n from the pre-processed inputted speckle image, and seeking, in the pre-processed standard speckle image, an optimum matching block of the image block $block_{m \times n}$ within a search block $search\_block_{M \times N}$ having a size of M×N and centered on a corresponding position of the image block $block_{m \times n}$, according to a search strategy and a similarity measurement indicator, such that the displacement of the image block $block_{m \times n}$ is obtained, wherein M, N, m and n are integers, wherein M>m and N>n;

a depth calculating sub-module configured to calculate depth values of the image blocks in the pre-processed inputted speckle images, using a lookup table established according to different displacement values of the standard speckle image and corresponding depth values thereof, based on the displacement of the image blocks, to obtain a calculated depth image sequence, wherein one of the depth values of the image blocks is obtained from the lookup table when one of a horizontal displacement value and a vertical displacement value serves as an input value of the lookup table; and a depth image post-processing sub-module configured to reduce noises of the calculated depth image sequence by noise-reducing filtering.

2. The device as recited in claim 1, wherein the digital video format is a Bayer or ITU656/ITU601 video format.

3. The device as recited in claim 1, wherein the noise-reducing filtering comprises median filtering or average filtering.

4. The device as recited in claim 1, wherein the search strategy comprises searching the image blocks one by one within the search block $search\_block_{M \times N}$ for the optimum matching block first in a horizontal direction and then in a vertical direction.

5. The device as recited in claim 1, further comprising a microprocessor configured to control operations of the image adaptive pre-processing sub-module, the memory, the block-matching motion estimation sub-module, the depth calculating sub-module and the depth image post-processing sub-module.

6. The device as recited in claim 4, wherein the block-matching motion estimation sub-module is further configured to extract the image blocks from the inputted speckle image for matching in a step less than a size of the matching block.

7. The device as recited in claim 1, wherein the adaptively de-noising comprises window filtering or Gaussian filtering, and wherein the enhancing comprises histogram enhancing, gray linear enhancing, or binarization processing.

8. The device as recited in claim 1, wherein step length of the image block $block_{m \times n}$ extracted from one of the inputted speckle images is smaller than a size of the optimum matching block.

9. The device as recited in claim 1, wherein spot pattern of each of the inputted speckle images is obtained by operations of zooming or translating spot pattern of the standard speckle image.

10. The device as recited in claim 1, wherein motion-vector information of each of the inputted speckle images is obtained by block-matching motion estimation with similarity calculation.

11. The device as recited in claim 1, wherein the depth image post-processing sub-module is configured to reduce depth holes of depth images outputted by the depth image post-processing sub-module, and wherein the depth holes are formed by mismatching during processes of block-matching motion estimation.

12. The device as recited in claim 1, wherein the standard speckle image is a single speckle image.

\* \* \* \* \*